United States Patent [19]

Sargent et al.

[11] 4,096,067
[45] Jun. 20, 1978

[54] VOLUME DISPLACEMENT ROD AND HOLDER

[75] Inventors: Charles L. Sargent, Ypsilanti; Allan J. Coviello, Ann Arbor; Dennis A. Russell, Belleville, all of Mich.

[73] Assignee: Thetford Corporation, Ann Arbor, Mich.

[21] Appl. No.: 803,646

[22] Filed: Jun. 6, 1977

[51] Int. Cl.$^2$ .................... B01D 13/00; C02B 1/82
[52] U.S. Cl. ...................... 210/252; 210/321 R; 210/433 M; 210/456
[58] Field of Search ......... 210/321 R, 433 M, 257 M, 210/456, 252; 55/158

[56] References Cited
U.S. PATENT DOCUMENTS

| | | |
|---|---|---|
| 3,256,678 | 6/1966 | Bertin et al. .......................... 55/158 |
| 3,648,754 | 3/1972 | Sephton ........................... 210/321 R |
| 3,834,545 | 9/1974 | Del Pico et al. ................ 210/321 R |
| 3,922,220 | 11/1975 | Middleman et al. .................... 210/23 |
| 3,950,249 | 4/1976 | Eger et al. ............................ 210/104 |
| 4,021,350 | 5/1977 | Koslowski ....................... 210/321 R |

Primary Examiner—Charles N. Hart
Assistant Examiner—David B. Sadowski
Attorney, Agent, or Firm—Olsen and Stephenson

[57] ABSTRACT

Apparatus is provided for treatment of a fluid by use of a membrane tube wherein a volume displacement rod is positioned longitudinally through the membrane tube to provide desired filtration conditions for removal of a permeate from the fluid, and an improved support arrangement for the rod is provided that eliminates the use of a spider or similar support structure that constitutes a fluid flow obstruction. In the disclosed embodiment, the remote ends of the rod are seated in sockets located in bends in the walls of the inlet and outlet conduits associated with the membrane tube.

10 Claims, 1 Drawing Figure

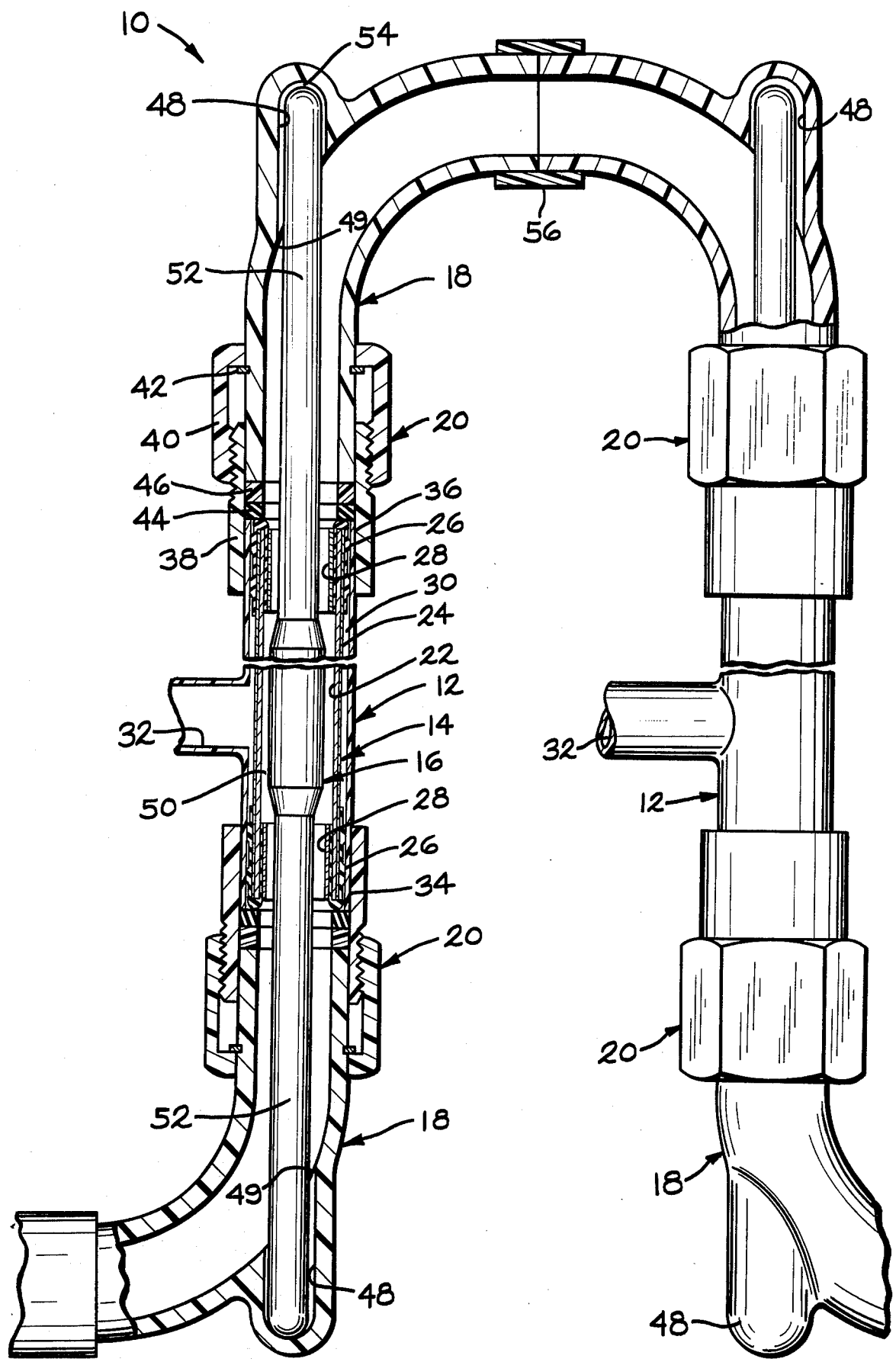

VOLUME DISPLACEMENT ROD AND HOLDER

BACKGROUND OF THE INVENTION

The present invention relates to apparatus for treatment of a fluid wherein a semipermeable membrane is utilized to separate a permeate from waste fluid, and more particularly to a membrane tube through which a volume displacement rod extends and to the structure for supporting the rod in the fluid flow stream so as to avoid obstruction of the flow of fluid and to assure optimum performance of the membrane.

Membrane separation processes employing tubular membranes are well-known in the prior art. United States Pat. No. 3,834,545, patented Sept. 10, 1974 in the names of Del Pico et al., discloses a membrane tube that is suitable for use in a separation process. Membrane tubes of this character can be used in a variety of different separation processes, including the process which is disclosed in United States Pat. No. 3,950,249, patented Apr. 13, 1976 in the names of Eger et al. The process disclosed in this patent involves recovery of water from the effluent discharged by a biological treatment system, the water then being available for reuse in the flushing system that discharges to the biological treatment system.

It has been found beneficial to insert a volume displacement rod axially through the membrane tube, as is shown in FIG. 14 of U.S. Pat. No. 3,950,249, to improve the efficiency of operation of the membrane tube and to aid in maintaining the inner surface of the semipermeable membrane in a clean state. This has been done by constructing spider-like support structures that can be secured at the ends of the membrane tube, and the rod is supported at its ends by these spider-like structures. This construction and arrangement is not entirely satisfactory in use. This spider-like structures interfere to some extent with the flow of the fluid, and this defect becomes increasingly more pronounced as the spider-like structures accumulate or become coated with solid waste particles. Also, the rod is held firmly between the support structures, and due to thermal expansion and flow characteristics of the fluid, the rod, which has generally been constructed of a flexible material, may bow out of alignment with the axis of the membrane tube. This then causes non-uniform flow of the fluid through the annular passageway defined between the rod and the semipermeable membrane resulting in certain areas of the membrane being less productive than other areas.

SUMMARY OF THE INVENTION

The present invention has overcome the inadequacies of the prior art and provides improvements in apparatus for separation of a relative clear permeate from a waste fluid.

According to a preferred form of the present invention, apparatus is provided for treatment of a fluid comprising a permeate collection casing having aligned inlet and outlet ends, a membrane tube supported at its ends in the casing in communication with the ends; conduit means coupled to the casing at the inlet and outlet ends, and a volume displacement rod extending lengthwise through the membrane tube in spaced relation thereto. The conduit means that are located at each end of the inlet and outlet ends provide support structures for the ends of the rod so that obstructions to flow of fluid is avoided. In the disclosed embodiment, the conduit means have a bend with a socket in the outer portion thereof in axial alignment with the axis of the membrane tube. The volume displacement rod has axial extensions extending into the sockets for supporting the volume displacement rod free of any other supporting structure that might interfere with the flow of the fluid through the membrane tube. Preferably the volume displacement rod has axial extensions of a reduced diameter so that the effective flow area at the regions where the axial ends enter the sockets in the conduit means will be greater than the effective cross-sectional area in the annular passageway between the rod and the membrane of the tube so as not to impede or restrict the flow of the fluid. It is a feature of the invention that the axial dimension between the inner ends of the sockets is greater than the axial length of the volume displacement rod so that axial extension of the volume displacement rod can occur without placing it in a state of axial compression tending to bow it. For this purpose the support structure is constructed so that the sockets and the axial extensions have a free-sliding fit to allow axial movement of the rod within the sockets. The rod is also preferably made of a material more rigid than has been used heretofore so as to assure that the rod is not laterally displaced within the membrane tube as the result of the flow characteristics of the fluid passing through the annular passageway between the rod and the membrane. Still further, it is another feature that coupling means are provided between the casing and the conduit means so that they can readily be separated to allow removal of the displacement rod and tubular membrane for servicing and replacement purposes.

Still another feature of the present invention is the specific construction and arrangement of the conduit means whereby they can be used either with a single membrane tube or together with a plurality of membrane tubes connected together in series.

Thus, it is an object of the present invention to provide improved apparatus for separation of a permeate from a waste fluid.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

The FIGURE of the drawing is a fragmentary elevational view, partly in section, illustrating apparatus embodying the present invention.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The apparatus 10 for treatment of a fluid is particularly adapted for use in conjunction with a sanitary waste treatment plant of the type illustrated and described in the aforesaid U.S. Pat. No. 3,950,249, but it will be understood that the invention can be used readily in other systems where it is desired to collect a permeate from a fluid that has been subjected to a membrane separation process.

The apparatus 10 includes the permeate collection casing 12, the membrane tube 14, the volume displacement rod 16, the conduit means 18, and the coupling means 20 whereby the permeate collection casing 12 is coupled to the conduit means 18.

The membrane tube 14 will not be described in detail, because details of construction of the tube, per se, are not a part of the present invention, and its construction and arrangement is fully described in the aforesaid U.S. Pat. No. 3,834,545, to which reference is made. Briefly, the membrane tube includes a semipermeable membrane 22 and a porous support tube 24, a boot assembly 26 at each end thereof and a cylindrical snap ring or ferrule 28 also at each end thereof. The construction and arrangement of the membrane tube 14 and the permeate collection casing 12 is such as to provide a permeate collection space 30 between these components, and the permeate collection casing has an outlet port 32 for discharge of the collected permeate. The permeate collection casing 12 has axially aligned inlet and outlet ends 34 and 36, and the membrane tube 14 is supported at its end portions within the casing 12 adjacent to the inlet and outlet ends.

The conduit means 18 are coupled to the casing 12 at each of the inlet and outlet ends 34 and 36 so as to be in communication with the interior of the membrane tube 14 for passage of the fluid to be treated. The conduit means are coupled to the casing 12 by the coupling means 20, only the upper one of which will be described, since the several coupling means 20 are identically the same. The coupling means 20 includes the male fitting 38 which is secured to the outer surface of the casing 12, and the female compression fitting 40 which is fitted for relative rotation on the outer surface of the conduit means 18 and is seated on the lock ring 42 which is mounted on the outer surface of the conduit means 18. The male fitting 38 and female compression fitting 40 are threadedly connected together so that turning of the female compression fitting on the threaded portion of the male fitting 38 will advance the conduit means 18 axially toward the end of the casing 12. Similarly, turning the female compression fitting in the opposite direction will result in releasing the conduit means 18 from the casing 12. To assure an effective seal at the coupling connection, a ring 44 and a gasket 46 are provided between the conduit means 18 and the casing 12 and membrane tube 14. The ring 44 is preferably made of a suitable plastics material which will exert pressure on the boot 26 to assure a seal between the boot and the casing 12. The gasket 46 is preferably an elastomeric member which will provide an effective seal between the male fitting 38 and the outer wall of the conduit means 18.

For the purpose of supporting the volume displacement rod 16, the conduit means 18 are provided with sockets 48 located in the outer portions of the walls defining the bends in the conduit 18. The sockets 48 are in axial alignment with the axis of the membrane tube 14 so that the volume displacement rod 16 will be centered throughout the length of the membrane tube 14. The volume displacement rod 16 has a smaller diameter than the internal diameter of the membrane tube 14 so as to provide an annular passageway 50 therebetween. No other support structures are provided for the volume displacement rod 16, thereby assuring uniform flow through the annular passageway 50.

The volume displacement rod 14 has axial extensions 52 which are an integral part thereof and which extend into the sockets 48. Thus, the effective cross-sectional area of the passageway at the conduit means 18 at the location 49 where the volume displacement rod 16 is supported is greater than is the effective cross-sectional area of the annular passageway 50 so that the support structure for the volume displacement rod 16 does not restrict in any way with the flow of the fluid through the annular passageway 50.

The volume displacement rod 16 has a longitudinal dimension which is smaller than the axial dimension between the inner ends of the sockets 48 so as to provide a small space 54 which will be sufficient to compensate for expansion and contraction of the volume displacement rod 16 that may result due to thermal expansion and the like. Also, the axial extensions 52 are dimensioned so that they will have a sliding fit in the sockets 48 to allow free expansion and contraction of the volume displacement rod 16 to assure that it does not become subjected to axial compression which might tend to bow it out of its axial alignment within the membrane tube 14.

Another feature of each conduit means 18 is its construction and arrangement wherein it may be a U-shaped member joined together at 56 by a slip fitting or a bonded joint to enable a series of membrane tubes 14 to be employed. Also, the conduit means 18 can be a right-angle elbow for use at the inlet or outlet end of the filtration system.

It is claimed:

1. Apparatus for treatment of a fluid comprising a permeate collection casing having a permeate outlet port and axially aligned inlet and outlet ends, a membrane tube supported at its end portions within said casing adjacent to said inlet and outlet ends so as to provide a space between said casing and the midportions of said membrane tube for collection of permeate, conduit means coupled to said casing at each of said inlet and outlet ends in communication with the interior of said membrane tube for passage of said fluid, the permeate collection space between said casing and the exterior of said membrane tube being in communication with said permeate outlet port, a volume displacement rod supported in said conduit means and extending lengthwise through said membrane tube in spaced relation thereto so as to provide a continuous annular passageway for passage of said fluid free of obstructions between said volume displacement rod and said membrane tube, said volume displacement rod having axial extensions for supporting it in said conduit means free of other obstructions between said volume displacement rod and said conduit means.

2. The apparatus that is defined in claim 1, wherein said axial extensions are integral with the portion of the volume displacement rod extending through the membrane tube and are of a reduced diameter.

3. The apparatus that is defined in claim 1, wherein each said conduit means has a curved portion directed away from the axis of said volume displacement rod, each curved portion containing a socket in which an end of said volume displacement rod is received, the sockets receiving the opposite ends of the volume displacement rod providing the only support for the volume displacement rod.

4. The apparatus that is defined in claim 3, wherein the axial dimension between the inner ends of the sockets is greater than the axial length of the volume displacement rod so that axial expansion of the volume displacement rod can occur without placing it in a state of axial compression.

5. The apparatus that is defined in claim 1, wherein said volume displacement rod is sufficiently rigid so as to prevent lateral displacement of the volume displacement rod due to the flow characteristics of the fluid through said annular passageway.

6. The apparatus that is defined in claim 1, wherein each said conduit means in coupled to said casing by a coupling means comprising a male fitting secured to said casing and a female compression fitting operably mounted on said casing for turning thereon, said coupling means being operable when said female compression fitting is turned in one direction to release said conduit means from said casing for removal and replacement of said membrane tube and when said female compression fitting is turned in the other direction to urge the adjacent ends of said membrane tube and casing toward one another.

7. The apparatus that is defined in claim 1, which includes a plurality of membrane tubes arranged for flow of said fluid therethrough in series, adjacent membrane tubes being positioned in parallel relation and joined by a U-shaped conduit means.

8. The apparatus that is defined in claim 7, wherein each U-shaped conduit means has two symmetrical half-portions operably joined together at the base of the U configuration.

9. The apparatus that is defined in claim 7, wherein the conduit means at each end of the series of membrane tubes is in the shape of a right angle elbow.

10. Apparatus for treatment of a fluid comprising a permeate collection casing having aligned inlet and outlet ends, a membrane tube supported at its ends in said casing in communication with said ends, conduit means coupled to said casing at said inlet and outlet ends, a volume displacement rod extending lengthwise through said membrane tube in spaced relation thereto, the conduit means at each of said inlet and outlet ends having a bend with a socket in the outer portion thereof in axial alignment with the axis of said membrane tube, said volume displacement rod having axial extensions extending into the sockets for supporting the volume displacement rod.

* * * * *